(12) United States Patent
Shindo et al.

(10) Patent No.: US 6,782,707 B2
(45) Date of Patent: Aug. 31, 2004

(54) AIR CONDITIONER

(75) Inventors: Yasuhiro Shindo, Kawasaki (JP); Hiroyuki Hamano, Kawasaki (JP); Shun Iwano, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 10/440,358

(22) Filed: May 19, 2003

(65) Prior Publication Data
US 2003/0217561 A1 Nov. 27, 2003

(30) Foreign Application Priority Data
May 21, 2002 (JP) .................................. 2002-145596

(51) Int. Cl.[7] .............................................. F25D 23/00
(52) U.S. Cl. ................................. 62/264; 62/78; 62/262
(58) Field of Search ............................ 62/78, 262, 264

(56) References Cited

FOREIGN PATENT DOCUMENTS

| JP | 410160181 A | * | 6/1998 |
|---|---|---|---|
| JP | 11182880 A | * | 7/1999 |

* cited by examiner

Primary Examiner—Melvin Jones
(74) Attorney, Agent, or Firm—Manabu Kanesaka

(57) ABSTRACT

For deodorizing and sterilizing indoor air to make the residence space a comfortable environment, a lamp box (300) having an air inlet (320) and an air outlet (330) between the upper ends of a front heat exchanger (210) and a rear heat exchanger (230), and containing an ultraviolet lamp (310) is placed, ultraviolet light with the waveband of 250 to 260 nm and ultraviolet light with the waveband of 100 to 220 nm are emitted from the ultraviolet lamp (310), and a part of the ultraviolet light is applied to at least the rear heat exchanger (230) through the air outlet (330).

8 Claims, 4 Drawing Sheets

AIR CONDITIONER

TECHNICAL FIELD

The present invention relates to an air conditioner, and more particularly to an air conditioner having sterilization and deodorization means in an indoor machine housing to keep the indoor environment comfortable and clean.

BACKGROUND ART

An air conditioner having a deodorization capability in an indoor machine housing for improving the comfort of the indoor environment is proposed in Japanese Patent Application Publication No. H01-169247. The internal structure of the indoor machine housing is shown in FIG. 4A.

In this figure, the indoor machine housing has grilled air intake ports 30 and 31 on the front and upper faces of a box-shaped housing, respectively, and has an air discharge port 32 having a wind vane in the lower part of the front face.

A heat exchanger 33 and an air fan 34 are placed in an air duct extending between the air intake ports 30 and 31 and the air discharge port 32 in the indoor machine housing.

An air filter 35 for removing dust contained in sucked air is placed along the air intake ports 30 and 31 on the inner face of the housing, and deodorization means 36 is provided on the side of the front face of the heat exchanger 33.

As shown in FIG. 4B, the deodorization means 36 comprises a high-voltage generator 36a and a discharge apparatus 36b having a discharge electrode plate, and gives ozone to air that has passed through the air filter 35 to deodorize the air by its oxidative effect.

Since the air conditioner is normally operated while the room is kept closed, it has been required in recent years that not only the air be deodorized, but also airborne microorganisms be removed to keep the indoor environment cleaner, and various germs deposited on the inner face of the indoor machine housing and the heat exchanger be removed when the air conditioner is not operated.

Thus, the object of the present invention is to provide an air conditioner capable of decomposing and removing odor components contained in air, and effectively removing airborne microorganisms and various germs deposited on the inner face of an indoor machine housing and a heat exchanger.

SUMMARY OF THE INVENTION

For achieving the above object, the present invention provides an air conditioner comprising an indoor machine housing having air intake ports on at least the front and upper faces and having an air discharge port in the lower part of the front face, in which heat exchanging means and an air fan are provided in an air duct extending between the air intake ports and the air discharge port in the indoor machine housing, and at least two heat exchangers: one being a front heat exchanger placed on the side of the front face of the housing and the other being a rear heat exchanger placed on the side of the rear face of the housing are provided as the heat exchanging means, wherein a lamp box having an ultraviolet lamp therein is placed between the upper ends of the front heat exchanger and the rear heat exchanger, the lamp box has an air inlet and an air outlet for letting a part of air sucked from the air intake port into the indoor machine housing pass through the lamp box, and a part of ultraviolet light emitted from the ultraviolet lamp is applied to at least the rear heat exchanger from the air outlet.

According to this, deodorization and sterilization is performed with ultraviolet light in the lamp box, and the ultraviolet light is emitted from the air outlet into at least the rear heat exchanger, whereby various germs deposited on the heat exchanger can be removed.

In the present invention, the front heat exchanger and the rear heat exchanger are preferably tilted so that the upper faces thereof are brought close to each other to form an A-type configuration, whereby the lamp box can stably be placed within a limited space in the indoor machine housing.

In the present invention, ultraviolet light with the waveband of 250 to 260 nm having an effect of removing airborne microorganisms, and ultraviolet light with the waveband of 100 to 220 nm having an effect of decomposing odor components contained in air to deodorize the air are emitted from the ultraviolet lamp. In this case, a first ultraviolet lamp emitting ultraviolet light with the waveband of 250 to 260 nm and a second ultraviolet lamp emitting ultraviolet light with the waveband of 100 to 220 nm may be used in combination.

Also, according to the preferred aspect of the present invention, for improving the structural strength, header plates provided on both sides of the front heat exchanger and the rear heat exchanger are extended, and the lamp box is supported on the extended portion.

For distributing ultraviolet light thoroughly in the lamp box, and preventing deterioration of the material by ultraviolet light, the inner face of the lamp box is preferably plated with a plating solution containing aluminum and zinc. For the similar reason, the lamp box may be made from a stainless steel plate or chrome-plated steel plate.

For applying ultraviolet light to air flowing into the lamp box for a longest possible time, it is preferable that the ultraviolet lamp is placed such that it is shifted to one side in the lamp box, the air inlet is placed such that it is shifted to the side opposite to the ultraviolet lamp, and the air outlet is placed near the ultraviolet lamp.

Also, a cleaning fluid may flow into the lamp box and be accumulated therein when the interior of the indoor machine housing is cleaned with a liquid. In order that the cleaning fluid can easily be removed, it is preferable that the bottom face of the lamp box is a plane inclined downward from one side of the side wall on which the ultraviolet lamp is placed toward the other side of the side wall opposite to ultraviolet lamp, and drainage means is provided on the other side of the side wall.

DETAILED DESCRIPTION

Preferred embodiments of the present invention will be described below with reference to FIGS. 1 to 3.

Figure 1:
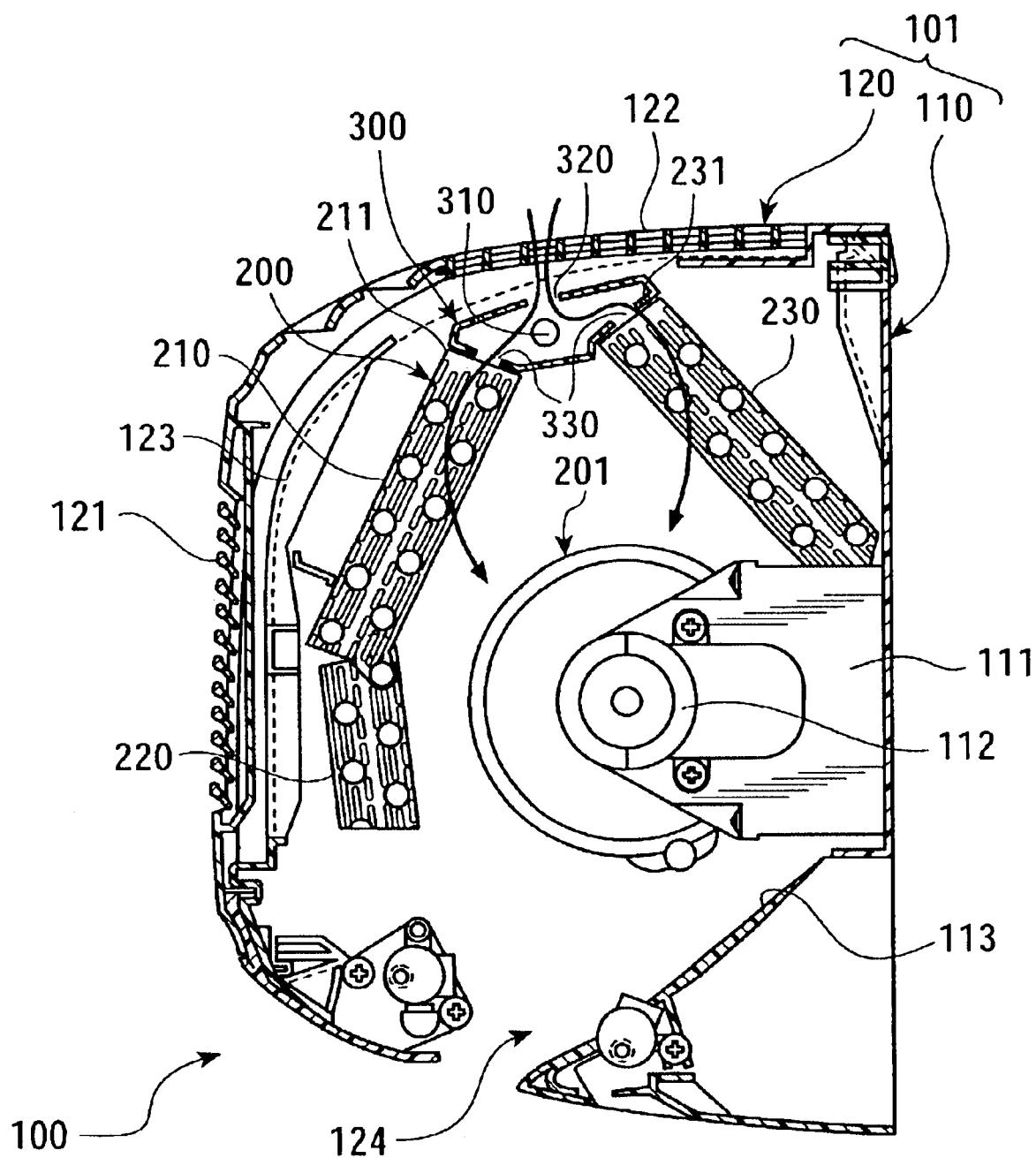
FIG. 1 is a schematic sectional view showing the inner structure of an indoor machine provided in an air conditioner of the present invention.

An indoor machine 100 shown in FIG. 1 is of hanging-up-on-the-wall type, and comprises as its housing 101 a base 110 fixed on the indoor wall and a decorative panel 120 with which the base 110 is covered.

Grilled air intake ports 121 and 122 are provided on the front and upper faces the decorative panel 120. In the inner face of the decorative panel 120, an air filter 123 is placed along the air intake ports 121 and 122 as shown by the alternate long and short dash line. An air discharge port 124 is provided at the lower end the decorative panel 120.

In the indoor machine 100, heat exchanging means 200 and an air fan 201 are placed in an air duct extending from the air intake ports 121 and 122 to the air discharge port 124. The heat exchanging means 200 is supported between a pair of right and left side plates (not shown) provided in the base 110, the air fan 201 is supported on by the base 110 via a support plate 111 having a bearing 112.

Also, an air guide face 113 guiding air blown from the air fan 201 toward the air discharge port 124 is formed in the base 110. Although not shown in the figure, a vertical wind vane and a horizontal wind vane are provided in the air discharge port 124 in a well-known form.

In this example, the heat exchanging means 200 includes three heat exchangers: two front heat exchangers 210 and 220 placed on the side of the air intake port 121 of the decorative panel 120 and one rear heat exchanger 230 placed on the side of the base 110.

The front heat exchangers 210 and 220 are coupled together vertically, and the lower front heat exchanger 220 is almost vertically oriented, whereas the upper front heat exchanger 210 is oriented slantingly in such a manner that its upper end is inclined toward the base 110.

Also, the rear heat exchanger 230 is oriented slantingly in such a manner that its upper end is inclined toward the air intake port 121 of the decorative panel 120. That is, the front heat exchanger 210 and the rear heat exchanger 230 are arranged in A-type configuration when viewed from the side face so that the space between their upper ends is narrowed.

According to the present invention, a lamp box 300 having therein an ultraviolet lamp 310 is provided between the upper ends 211 and 231 of the front heat exchanger 210 and the rear heat exchanger 230 inclusive.

Figure 2:
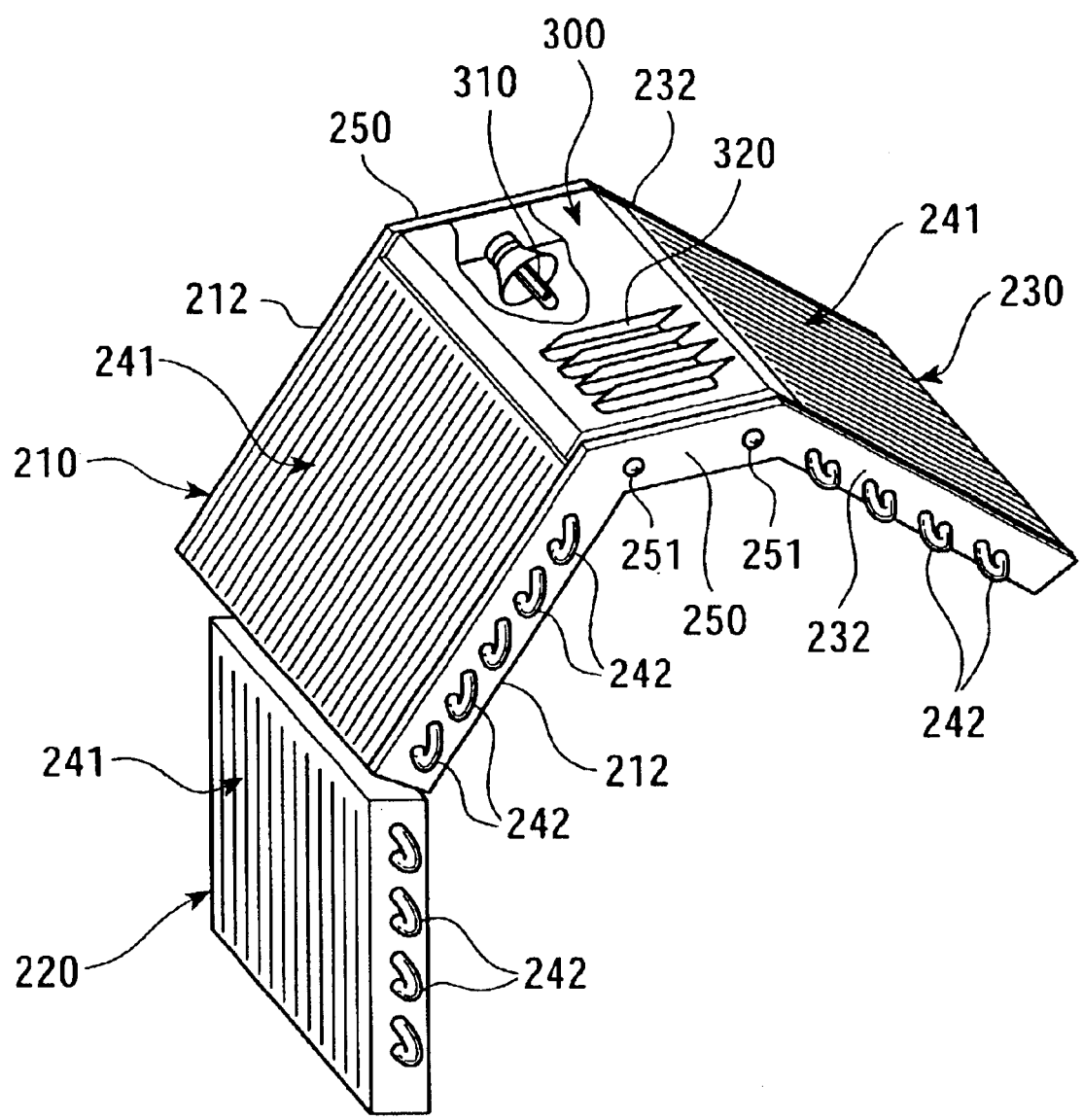
FIG. 2 is a perspective view showing a main part of the present invention.

Referring to FIG. 2, the heat exchangers 210, 220 and 230 each have a group of fins 241 including a large number of fins arranged in parallel with one another, and a coolant pipe (not shown) running in a zigzag form in such a manner that it is orthogonal to the group of fins 241, the coolant pipe is connected to U-tubes 242 provided in a pair of right and left header plates provided on both sides of the group of fins 241.

In this example, the upper ends of the header plate 212 of the front heat exchanger 210 and the header plate 232 of the rear heat exchanger 230 are extended so that they are coupled together, the lamp box 300 is fixed in a joint 250 thereof by a screw 251.

Furthermore, as an alternative, the header plate 212 and the header plate 232 may be coupled together via the lamp box 300 instead of coupling the upper ends of the header plate 212 and the header plate 232 as one united body.

Figure 3:
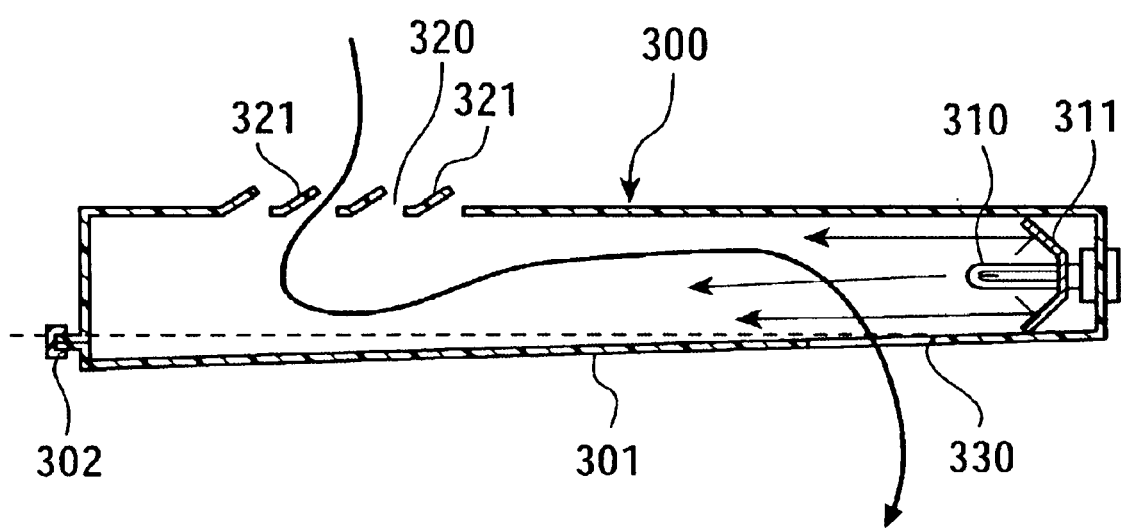
FIG. 3 is a schematic sectional view showing a lamp box in the present invention.
Figure 4A:
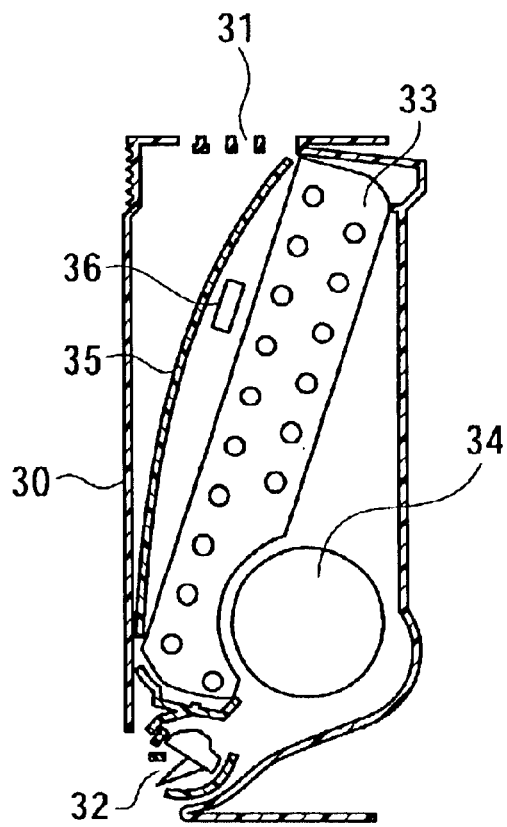
FIG. 4A is a schematic sectional view showing the inner structure of an indoor machine comprising deodorization means as the prior art.
Figure 4B:
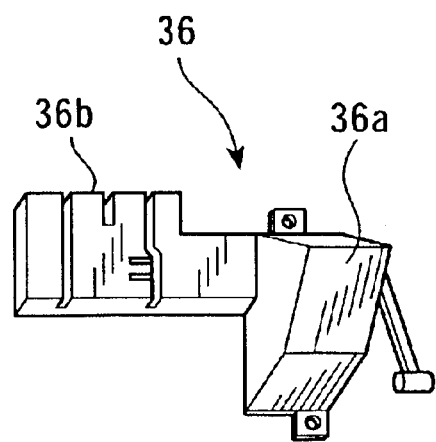
FIG. 4B is a perspective view showing the deodorization means.

Referring also to FIG. 3, the lamp box 300 containing an ultraviolet lamp 310 is placed with a reflection mirror 311 mounted on the rear side thereof. The ultraviolet lamp 310 emits ultraviolet light with the waveband of 250 to 260 nm (nanometers) capable o removing airborne microorganisms and ultraviolet light with he waveband of 100 to 220 nm capable of generating ozone oxidization-decomposing odor components contained in air to deodorize the air.

Such ultraviolet lamps emitting ultraviolet lights of different wavebands include, for example, ZL-40C (manufactured by OKAYA ELECTRIC INDUSTRIES Co., LTD.), but in some circumstances, two ultraviolet lamps: an ultraviolet lamp emitting ultraviolet light with the waveband of 250 to 260 nm and a an ultraviolet lamp emitting ultraviolet light with the waveband of 100 to 220 nm may be used.

The lamp box 300 is constituted by a narrow and long box having a length almost equivalent to the wide of the front heat exchanger 210 and the rear heat exchanger 230, and the ultraviolet lamp 310 is preferably placed in such a manner that it is shifted to one side in the lamp box 300.

In this example, the lamp box 300 is located just below the air intake port 122 formed on the upper face of the decorative panel 120. An air inlet 320 for letting a part of air sucked in the housing 101 of the indoor machine 100 flow into the lamp box 300 is provided on the upper face of the lamp box 300 facing the air intake port 122. In this example, the air inlet 320 is formed by cutting a part of the lamp box 300 into a louver shape, but it may be simply a drainage hole.

Also, air outlets 330 opened toward the upper end 211 of the front heat exchanger 210 and the upper end 231 of the rear heat exchanger 230, respectively, are provided on the bottom face 301 of the lamp box 300.

In this case, for applying ultraviolet light to air flowing into the lamp box 300 for a longest possible time, in other words, for letting the air stay in the lamp box 300 for a longer time, it is preferable that the air inlet 320 is placed in such a manner that it is shifted to the opposite side of the ultraviolet lamp 310, and the air outlet 330 is placed near the ultraviolet lamp 310 to provide a long air duct in the lamp box 300. In addition, as shown in FIG. 3, in the case where a part of the lamp box 300 is cut into louver pieces 321 for forming the air inlet 320, the air inflow direction defined by the louver pieces 321 is opposite with respect to the ultraviolet lamp 310.

Also, in order that the ultraviolet light emitted from the ultraviolet lamp 310 is effectively reflected in the lamp box 300, the inner face of the lamp box 300 is preferably plated with a plating solution containing aluminum alone or aluminum and zinc. In this way, the efficiency of reflection of ultraviolet light is improved, and the anti-corrosive characteristic is maintained for a long time owing to aluminum compared to zinc plating. Furthermore, instead thereof, even if the lamp box 300 made from a stainless steel plate or chrome-plated steel plate is used, the same effect can be obtained, and such an aspect is also included in the present invention.

By rotation of the air fan 201 associated with the operation of the air conditioner, indoor air is sucked into the housing 101 of the indoor machine 100 through the air intake ports 121 and 122 of the decorative panel 120, heat-exchanged by the heat exchanging means 200, and discharged through the air discharge port 124 into the room.

At this time, as shown by the arrow in FIG. 3, a part of air sucked from the air intake ports 121 and 122 of the decorative panel 120 flows into the lamp box 300 through the air inlet 320, and is exposed to ultraviolet light of the above described specific wavelength emitted from the ultraviolet lamp 310 and thereby sterilized and deodorized, and thereafter the air is discharged through the air outlet 330 to the front heat exchanger 210 and the rear heat exchanger 230, heat-exchanged by the heat exchangers 210 and 230, and discharged through the air discharge port 124 into the room.

The sterilization and deodorization by ultraviolet light are repeatedly performed, whereby indoor air circulating in the housing 101 of the indoor machine 100 is gradually cleaned to provide a comfortable indoor environment.

Also, a part of ultraviolet light emitted from the ultraviolet lamp 310 is passed through the air outlet 330 into the front heat exchanger 210 and the rear heat exchanger 230, and therefore even if fungi are generated and airborne microorganisms are deposited on the inner faces of the heat exchanging means 200 and the housing 101 when the air conditioner is not operated, these microorganisms can be removed and air can be deodorized by, for example, emitting ultraviolet light from the ultraviolet lamp 310 for a predetermined amount of time before the air conditioner is operated, thus making it possible to discharge clean air into the room when the operation of the air conditioner is started.

Furthermore, in the above example, the air outlet 330 is provided on the bottom face 301 of the lamp box 300, but the air outlet 330 may be provided on the side face of the lamp box 300 depending on the shape of the lamp box 300. Also, for preventing ultraviolet light from the ultraviolet lamp 310 from being leaked into the room through the front face of the air intake port 121 inadvertently, a part of ultraviolet light emitted from the ultraviolet lamp 310 may be applied only to the rear heat exchanger 230.

In recent years, the inner part of the housing 101 of the indoor machine 100 has been cleaned with a liquid, but there have been cases where at this time, the cleaning fluid is leaked through the air inlet 320 into the lamp box 300 and accumulated therein.

Thus, in the present invention, in order that the cleaning fluid can easily be removed from the lamp box 300, the bottom face 301 of the lamp box 300 is a plane inclined downward from one side wall on which the ultraviolet lamp 310 is placed toward the other side wall opposite thereto, and a drainage hole 302 with a tap is provided on the side wall of the lamp box 300 smaller in height so that the cleaning fluid trapped in the lamp box 300 can be discharged, as shown in FIG. 3.

The preferred embodiments of the present invention have been described above with reference to the accompanying drawings, but the present invention is not limited thereto. Various alternatives and modifications that could be conceived by those having ordinary technical knowledge, who are engaged in the field of such air conditioners in the scope of technical philosophy described in the claims are included in the technical scope of the present invention as a matter of course.

What is claimed is:

1. An air conditioner comprising:
    an indoor machine housing having a front face with a lower part, a rear face, an upper face, air intake ports on at least the front and upper faces and an air discharge port in the lower part of the front face,
    an air duct extending between said air intake ports and said air discharge port in said indoor machine housing,
    at least two heat exchangers provided in the air duct and having a front heat exchanger placed on a side of the front face of the housing and a rear heat exchanger placed on a side of the rear face of the housing
    an air fan provide in the air duct, and
    a lamp box placed between upper ends of said front heat exchanger and said rear heat exchanger, said lamp box having an ultraviolet lamp device, an air inlet and an air outlet, said ultraviolet lamp device emitting first ultraviolet light with waveband of 250 to 260 nm having an effect of removing airborne microorganisms and second ultraviolet light with waveband of 100 to 220 nm having an effect of decomposing odor components contained in air to deodorize the air, a part of air sucked from said air intake ports to enter into said indoor machine housing passing through the lamp box to thereby remove airborne microorganisms and deodorize the air by the first and second ultraviolet lights, and being supplied to said rear heat exchanger from said air outlet.

2. The air conditioner according to claim 1, wherein said front heat exchange and said rear heat exchanger are tilted so that the upper ends thereof are brought close to each other.

3. The air conditioner according to claim 1, wherein said lamp box is supported on expanded portions of header plates provide on two sides of said front heat exchanger and said rear heat exchanger.

4. The air conditioner according to claim 1, wherein an inner face of said lamp box is plated with a plating solution containing aluminum and zinc.

5. The air conditioner according to claim 1, wherein said lamp box is made from a stainless steel plate or chrome-plated steel plate.

6. The air conditioner according to claim 1, wherein said ultraviolet lamp device is placed such that it is shifted to one side in said lamp box, said air inlet is placed such that it is shifted to a side opposite to said ultraviolet lamp device, and said air outlet is placed near said ultraviolet lamp device.

7. The air conditioner according to claim 6, wherein said lamp box has a bottom face inclined downward from one side wall on which said ultraviolet lamp device is placed toward the other side wall opposite to the ultraviolet lamp device, and drainage means is provided on said other side wall.

8. The air conditioner according to claim 1, wherein said ultraviolet lamp device emits the first ultraviolet light and the second ultraviolet light.

* * * * *